W. H. BIXLER.
Griddle-Greasers.
No. 140,992.  Patented July 22, 1873.
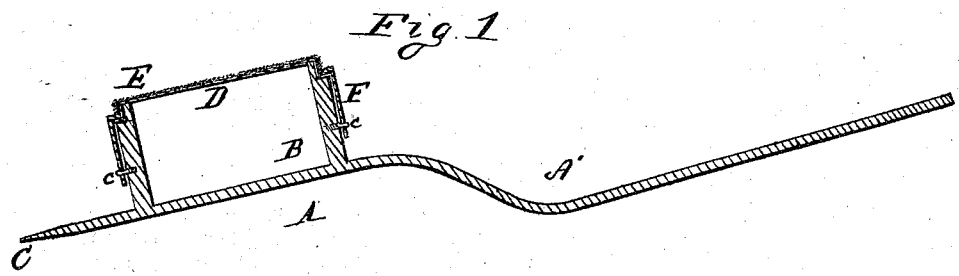
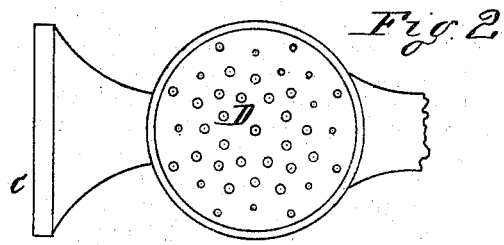
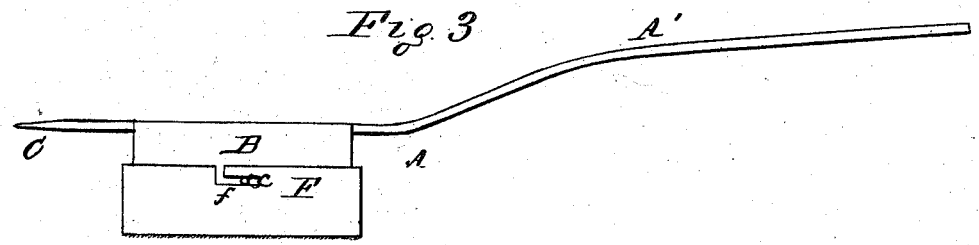
Witnesses
J. P. Connolly
N. Connolly
Inventor.
Washington H. Bixler
by Connolly Bros
his Att'ys

UNITED STATES PATENT OFFICE.

WASHINGTON H. BIXLER, OF EASTON, PENNSYLVANIA.

IMPROVEMENT IN GRIDDLE-GREASERS.

Specification forming part of Letters Patent No. 140,992, dated July 22, 1873; application filed June 16, 1873.

*To all whom it may concern:*

Be it known that I, W. H. BIXLER, of Easton, in the county of Northampton and State of Pennsylvania, have invented a certain new and useful Fountain-Lubricator for Griddles; and I do hereby declare the following to be a full, clear, and exact description of the invention, such as will enable others skilled in the art to which it pertains to make and use it, reference being had to the accompanying drawings, which form part of this specification.

In the drawings, Figure 1 is a longitudinal sectional view of my invention. Fig. 2 is a plan view, showing perforated cap with cloth removed. Fig. 3 is a side view.

My invention has for its object to provide a neat, handy, and economical device to be used in greasing griddles. A further object of my invention is to combine with such device means for scraping the griddle. My improvements consist in the construction of the device and of the parts thereof, as hereinafter fully described.

Referring to the accompanying drawing, A shows a cast-metal bar formed with a handle, A', a cup, B, and terminating in a chisel-end, C. The cup B is the receptacle for the fat or grease, which is kept therein by a perforated cap, D. Over this cap is placed a cloth, E, the edge of which is turned down all around and fastened by means of a metallic ring, F, having slots $f$, in which fit the ears or pins $c$ $c$ on the cup B.

The operation is as follows: The grease is put in the cup, the perforated cap, the cloth, and ring being then adjusted in position, as already described. When the cloth touches the hot griddle the grease oozes out of the holes in the cap and keeps the cloth constantly saturated, neither too much nor too little, but sufficient for lubricating purposes. When the cup is removed from the griddle the grease cools, and of course cannot run out. The cloth can be removed easily when worn out. The chisel-end C is intended as a scraper for removing baked batter, which forms on all griddles during the process of frying, and which might prevent the effective greasing of the griddle if not removed.

What I claim as my invention is—

1. The combined griddle greaser and scraper, consisting of the bar A having the handle A' and scraper C, and holding the lard-cup B, provided with a cloth or other covering to limit the escape of the contents, substantially as specified.

2. A griddle-greaser in combination with cup B, perforated cap D, cloth E, and securing-ring F, substantially as described.

In testimony that I claim the foregoing I have hereunto set my hand this 11th day of June, 1873.

WASHINGTON H. BIXLER.

Witnesses:
JAS. L. MINGLE,
C. EWD. HECHT.